United States Patent [19]

Stevens et al.

[11] Patent Number: 4,834,478
[45] Date of Patent: May 30, 1989

[54] TRACK ROLLER FRAME ASSEMBLY

[75] Inventors: Samuel B. Stevens, Pekin; James E. Gee, Washington; Andrew J. Tonsor, East Peoria, all of Ill.

[73] Assignee: Caterpillar Inc., Peoria, Ill.

[21] Appl. No.: 213,800

[22] Filed: Jun. 30, 1988

[51] Int. Cl.$^4$ ............................................. B62D 55/00
[52] U.S. Cl. ...................................... 305/21; 180/9.5
[58] Field of Search ...................... 305/21, 22, 24, 27, 305/28, 29, 31, 32, 56, 57; 180/9.5, 9.46, 9.54, 9.58

[56] References Cited

U.S. PATENT DOCUMENTS

| | | | |
|---|---|---|---|
| 1,966,544 | 7/1934 | Dopp | 180/9.46 |
| 2,670,249 | 2/1954 | Pilch | 305/8 |
| 2,786,724 | 3/1957 | Armington et al. | 305/9 |
| 2,988,159 | 6/1961 | Weber | 180/9.5 |
| 3,013,843 | 12/1961 | Sinko | 305/28 X |
| 3,583,509 | 6/1971 | Stachnik | 180/9.5 |
| 3,872,939 | 3/1975 | Eckert | 180/6.48 |
| 3,872,941 | 3/1975 | Copeland | 180/9.5 |
| 3,899,218 | 8/1975 | Blomstrom et al. | 305/9 |
| 3,924,703 | 12/1975 | Purcell | 180/9.54 |
| 3,960,061 | 6/1976 | Campbell | 91/506 |
| 3,974,891 | 8/1976 | Persson | 180/9.44 |
| 3,990,528 | 11/1976 | Haak et al. | 180/9.62 |
| 4,114,737 | 9/1978 | Fukui | 192/3 |
| 4,132,154 | 1/1979 | Nishiba | 91/491 |
| 4,326,450 | 4/1982 | Bacquie | 91/487 |
| 4,519,654 | 5/1985 | Satzler et al. | 180/9.54 X |
| 4,583,425 | 4/1986 | Mann et al. | 74/730 |
| 4,650,260 | 3/1987 | Satzler | 305/31 |
| 4,763,742 | 8/1988 | Langford | 180/9.5 X |

FOREIGN PATENT DOCUMENTS 1755168 12/1971 Fed. Rep. of Germany .
2149731 6/1985 United Kingdom .

OTHER PUBLICATIONS

Advertising Document Ref: DTS35F from Poclain Hydraulics of France, published circa Nov., 1986.

Primary Examiner—James B. Marbert
Assistant Examiner—Russell D. Stormer
Attorney, Agent, or Firm—Charles E. Lanchantin, Jr.

[57] ABSTRACT

A track roller frame assembly is connected to the main frame of a vehicle such as a combine harvester or the like, and is adapted to drive an elastomeric drive belt. An elongate track roller frame thereof includes a main body, pivot means on the main body for pivotal connection to the main frame, a supporting collar connected to the main body, and a plurality of roller wheels underlyingly connected to the main body. A wheel includes a housing encirclingly supported by the collar away from the pivot means, a shaft assembly rotatably supported within the housing, and inner and outer wheel portions connected to the opposite ends of the shaft assembly. A hydraulic drive motor within the housing rotates the shaft assembly and the wheel portions and drives the elastomeric drive belt. The drive motor is protectively located between the wheel portions, and the lightweight construction features the symmetrical transmission of belt forces and torque loads through the housing and into the supporting collar along the central plane of the track roller frame.

14 Claims, 5 Drawing Sheets

Fig_2_

Fig_3_

Fig. 4

Fig_7_

Fig_8_

TRACK ROLLER FRAME ASSEMBLY

DESCRIPTION

1. Technical Field

This invention relates generally to a tracked vehicle such as a combine harvester, earthmoving machine or the like, and more particularly to the construction of a pivotable track roller frame assembly therefor.

2. Background Art

Track-type undercarriages, such as those individually having a multi-segmented metallic track chain entrained about a rear sprocket wheel and a front idler wheel, are known to exhibit markedly superior performance characteristics in certain respects over wheel suspension systems. These track type undercarriages provide reduced ground pressure per unit area of contact and increased traction. Moreover, uneven and soft terrain vehicles equipped with track-type undercarriages have improved flotation and stability, and are more efficient than wheeled vehicles.

Most crawler tractors have two track roller frame assemblies which are pivotally mounted on aligned shafts to the rear of the main frame and which are adapted to limitedly swing in vertical, longitudinally oriented planes. Oscillation of the track roller frame assemblies is desirable to accommodate surface irregularities and to reduce shock loads, and the front portions thereof are often interconnected by an equalizer bar or generally equivalent leaf spring assembly which is centrally connected to the main frame. Exemplifying the art in this area are: U.S. Pat. No. 2,670,249 issued to J. S. Pilch on Feb. 23, 1954; U.S. Pat. No. 2,786,724 issued to R. Q. Armington, et al on March 26, 1957; U.S. Pat. No. 2,988,159 issued June 13, 1961 to F. Weber; U.S. Pat. No. 3,899,218 issued to G. D. Blomstrom, et al on Aug. 12, 1975; U.S. Pat. No. 3,974,891 issued Aug. 17, 1976 to J. E. Persson; and U.S. Pat. No. 4,650,260 issued Mar. 17, 1987 to R. L. Satzler.

Historically, the track roller frame assemblies have been mounted on the main frame for pivotal movement about the transverse axis of the driven rear sprocket wheels. But, it has been found that when large implement forces are imposed on the bearings of the sprocket wheels, such as are encountered when using a bulldozer blade, there is a marked decrease in the surface life of the bearings and associated elements. Accordingly, the track roller frame assemblies have often been pivotally connected to fixed shafts supported by the main frame and located forwardly of the sprocket wheels so that operating forces on the track roller frame assemblies and on the implement can be directed thereto independent of the sprocket wheels. In either case, the equalizer bar is supported on the front portions of the track roller frame assemblies.

United Kingdom patent application No. 2,149,731A filed on Nov. 17, 1983 by A. Terai, et al, and published June 19, 1985, discloses two track roller frame assemblies that are individually pivotally mounted on a fixed rear shaft structure that are also connected to the main frame by a forwardly disposed equalizer bar, and that individually incorporate a hydraulic drive motor on the inboard side of each sprocket wheel and a reduction gear unit on the outboard side of each sprocket wheel. In that construction each track roller frame assembly appears to be of the usual double rail type which is characterized as being heavy, complex, and costly to manufacture. Moreover, the hydraulic drive motor extends cantileverably and laterally inwardly from the inboard rail and the sprocket wheel so that the reaction forces of the drive motor are relatively ununiformly transmitted to the track roller frame through the inboard rail. Furthermore, the cantilevered drive motors are relatively susceptible to possible damage and form platforms that tend to collect mud and debris during operation of the vehicle. Another disadvantage is that each of these track roller frame assemblies powerably rotated a sprocket that drove a track chain having a plurality of pivotally interconnected metallic elements, and while such chains are widely used they have the disadvantage of causing undesirable vibrations and noise as the individual elements contact the ground. Moreover, the usual grousers of the track shoes of such chains are prone to damage the surface of the roadbeds.

Therefore, what is desired is a track roller frame assembly that is rugged and reliable, and yet is of a lightweight and economical structure. Such track roller frame assembly must support the hydraulic drive motor in relatively protected location, and be constructed to minimize the collection of debris on the upper surfaces of the drive motor. And further, each track roller frame assembly should be constructed to drive an elastomeric drive belt, rather than the usual multi-jointed metallic track chain through a drive wheel having laterally inner and outer wheel portions. These drive wheel portions are spaced apart to receive a plurality of guide members which extend radially inwardly from the drive belt, and to receive direct support from the track roller frame extending longitudinally and centrally therebetween. As is the usual case, the idler wheel portions are preferably resiliently urged longitudinally away from the drive wheel portions to provide the desired belt tension by a recoil mechanism of any conventional construction. The forces that are required to provide positive drive between the drive wheel and the belt are substantial, and it is contemplated that these forces, the torque reaction forces of the drive motors, and the forces due to the weight of the vehicle superstructure be transmitted to the body of the track roller frame and to the plurality of supporting roller wheels as uniformly as possible.

The present invention is directed to overcoming one or more of the above problems.

DISCLOSURE OF THE INVENTION

In one aspect of the invention there is provided a track roller frame assembly including an elongate main body and a plurality of roller wheels underlyingly connected to the main body, and with the main body being adapted to be connected to a vehicle main frame by a pivot joint having a first transverse axis. The track roller frame assembly desirably includes a wheel having a housing, a shaft assembly rotatably supported within the housing, and laterally inner and outer wheel portions connected to the opposite end members of the shaft assembly. Collar means extending centrally between the wheel portions are provided for supporting the wheel housing on the main body such that the shaft assembly is rotatable about an oscillatable second transverse axis, and a hydraulic drive motor is disposed within the housing and between the wheel portions in a protected location for powerably rotating the shaft assembly.

In another aspect of the invention a track roller frame assembly is adapted to be connected to a vehicle main frame for driving an elastomeric drive belt, and includes an elongate track roller frame having a main body, pivot means for connecting the main body to the main frame, and a supporting collar connected to the main body along a central plane thereof. The track roller frame assembly further includes a plurality of roller wheels under the main body, a wheel having a housing supported by the collar away from the pivot means, a shaft assembly, bearing means for rotatably supporting the shaft assembly within the housing, and inner and outer wheel portions connected to the opposite ends of the shaft assembly. Advantageously, a hydraulic drive motor is located within the housing and between the wheel portions in a relatively protected location for powerably rotating the shaft assembly and the wheel portions and driving the elastomeric drive belt.

The subject track roller frame assembly is especially ruggedly constructed for its weight, is economical to manufacture, is constructed to minimize the collection of debris on the upper surfaces thereof, and is convenient to couple to the main frame of the vehicle. Further, the distal end of an equalizer bar is universally connected to the track roller frame assembly in an efficacious manner. And still further, the components are so constructed and arranged as to allow the belt tension forces to be transmitted to the track roller frame body in a relatively symmetrical manner through the drive wheel housing and the supporting collar.

BEST MODE FOR CARRYING OUT THE INVENTION

Figure 1:
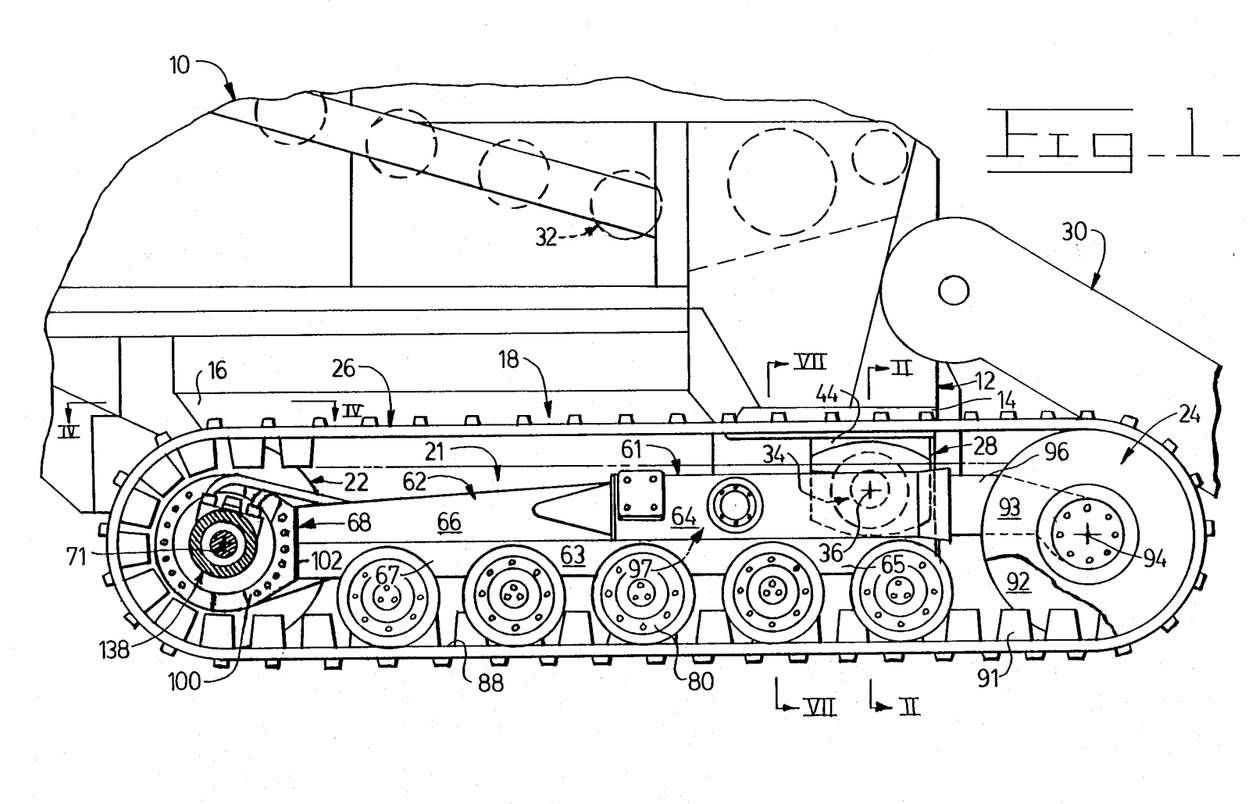
FIG. 1 is a diagrammatic, fragmentary, right side elevational view of a combine harvester employing a track roller frame assembly pivotally connected to the main frame and constructed in accordance with the present invention, and with portions of the front and rear wheels broken away to better show details of construction thereof.
Figure 3:
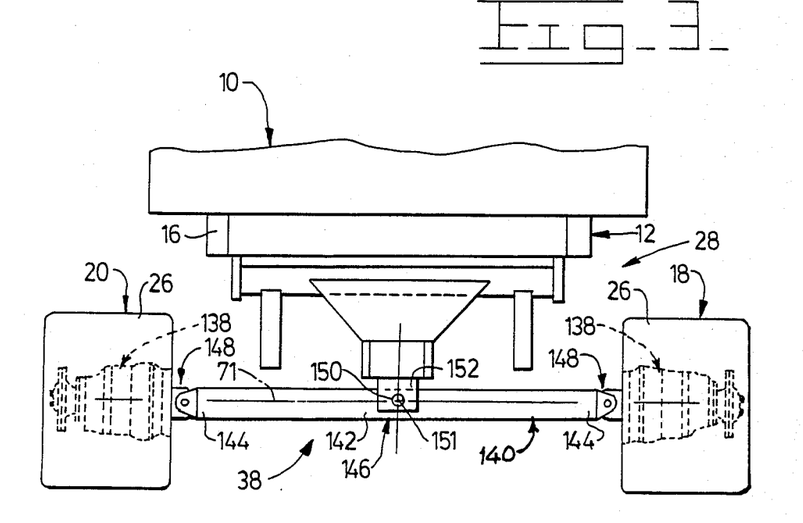
FIG. 3 is a diagrammatic rear end view of the combine harvester illustrated in FIG. 1 showing only the equalizer bar and the couplings associated therewith.

Referring to FIG. 1, there is shown the lower portion of a combine harvester vehicle 10 having a longitudinally extending main frame 12 with a first end or front end 14 and a second end or rear end 16 located respectively to the right and left when viewing the drawing. Right hand and left hand track-type undercarriages 18 and 20 are located generally elevationally below the main frame and provide the sole support for the vehicle as is illustrated in FIG. 3. These undercarriages are essentially mirror images of each other, and each one includes a track roller frame assembly 21 having a rear drive wheel 22 and a front idler wheel 24, and a ground-engaging track or drive belt 26 that encircles these wheels in the form of an endless loop in a well-known manner. A suspension structure 28 used in conjunction with the undercarriages provides the 3-point support for the combine harvester 10 and permits the harvesting of crops such as sugar cane, vegetables, rice and grains in predominantly soft and wet ground conditions. A conventional front-mounted harvesting implement 30, only a fragment of which is illustrated, is effective to gather the crop with forward movement of the vehicle and to urge it upwardly and rearwardly through the centrally located throat of a conventional threshing mechanism indicated only generally in FIG. 1 by the broken lines at reference number 32. It is to be understood that the harvesting mechanism itself could be of any suitable form, and that the depiction of the present invention within the context of a combine harvester is for purposes of example only, the invention also being adaptable to other forms of track-type vehicles and other implements.

Figure 2:
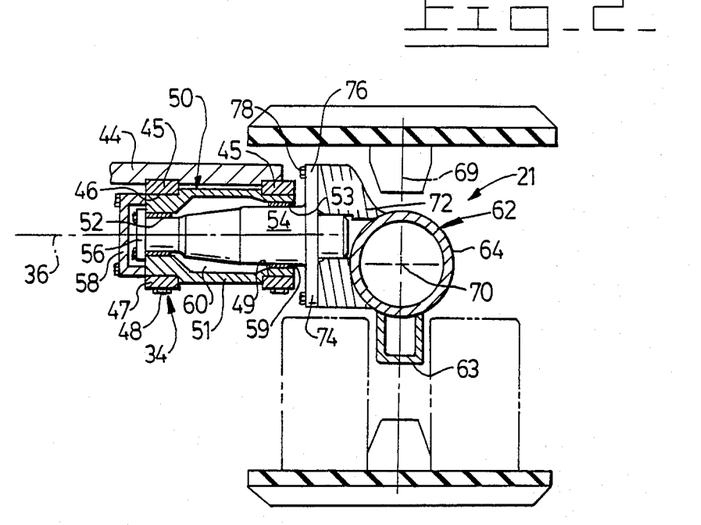
FIG. 2 is a diagrammatic and enlarged cross sectional view through the front pivot portion of the right-hand undercarriage as taken along the line II—II of FIG. 1, with portions thereof shown in phantom lines for convenience.

The suspension structure 28 includes pivot means or a pair of laterally separated pivot joints 34 as shown in FIGS. 1 and 2 for pivotally connecting the track roller frame assemblies 21 supportably to the front end 14 of the main frame 12 and permitting pivotal movement of the undercarriages 18 and 20 about a common horizontal and transversely oriented first axis or pivot axis 36. And at the rear end 16 of the main frame, as is shown in FIGS. 3-6, the suspension structure 28 includes a transversely extending and centrally pivoting support apparatus 38 for supporting the rear end of the main frame on the track roller frame assemblies of the undercarriages, preventing uncontrolled lateral spreading of the undercarriages, and transferring side forces laterally between the undercarriages.

More specifically, the representative front pivot joint 34 illustrated in FIGS. 1 and 2 includes a depending bracket 44 which is releasably secured to the front end 14 of the main frame 12. The bracket supports a pair of depending support blocks 45, with each block defining a downwardly facing semi-cylindrical internal surface or pocket 46. A pair of retention caps 47 are releasably secured to these blocks by a plurality o upwardly extending fasteners or bolts 48. Each of the retention caps defines an upwardly facing semi-cylindrical internal surface or pocket 49, so that the blocks and caps are adaptable to releasably clamp a stepped tubular housing 50 between them. The tubular housing has a raised rib 51 centrally therearound which is axially entrapped between the blocks and caps, and the tubular housing contains inner and outer sleeve bearings 52 and 53. A stepped and generally cylindrical stubshaft 54 which forms a part of each of the track roller frame assemblies 21 is supported for pivotal movement about the axis 36 in these sleeve bearings. An end retention cap 56 is provided which is releasably secured to the inner end of the stubshaft for restricting lateral motion therebetween. A cover 58 is releasably secured to the inner end of the tubular housing 50, and an annular seal ring 59 is disposed between the outer end of the tubular housing and the stubshaft for containing a lubricant within an enclosed chamber 60 defined thereby. Because the opposite pivot joints 34 are transversely separated, additional space is provided that can be utilized for greater ground clearance or for components mounted on the vehicle such as the centrally located throat of the threshing mechanism 32.

Figure 4:
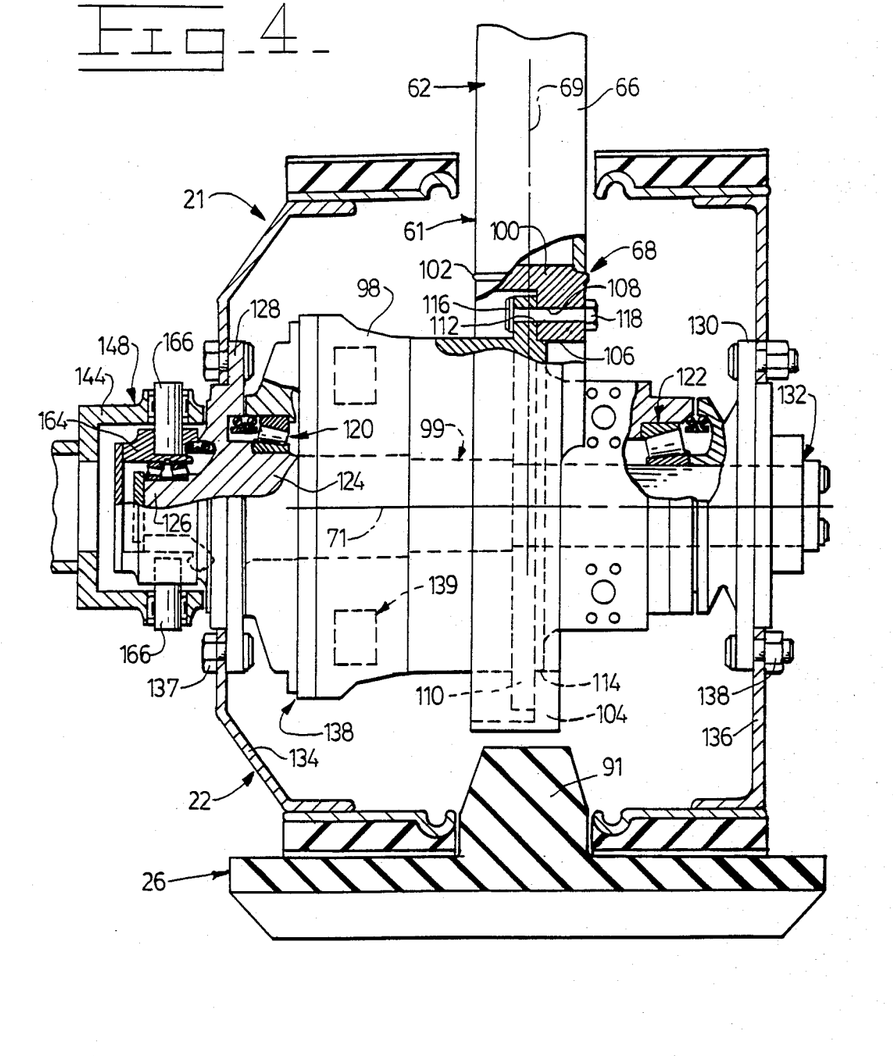
FIG. 4 is a diagrammatic and enlarged fragmentary top plan view of the suspension structure at the right rear drive wheel with portions thereof illustrated in cross section, and as taken generally along line IV—IV of FIG. 1.
Figure 5:
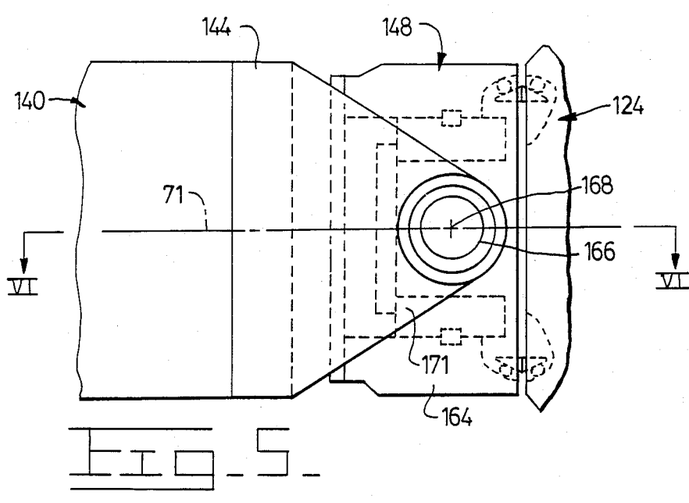
FIG. 5 is a diagrammatic and further enlarged fragmentary rear elevational view of the coupling means shown in FIG. 3 at the outer end of the equalizer bar.

As is shown in FIGS. 1, 2 and 4, the right-hand track roller frame assembly 21 also includes a track roller frame 61 having an elongate main body 62 defined primarily by an elongate channel-shaped base 63, a tubular casing 64 overlyingly connected to a front end 65 of the base, and a box beam transition structure 66 overlyingly connected to a rear end 67 of the base. The track roller frame further desirably includes collar means 68 connected to the rear end of the main body, or specifically to the rear portions of the base and the transition structure, for supporting the rear drive wheel 22 for rotation about a horizontal and transversely oriented second axis 71. Preferably, these major portions are weldably secured together and are generally arranged along a longitudinally oriented, vertical central plane 69 passing through a central axis 70 of the tubular casing 64 substantially parallel with the longitudinal midplane of the vehicle. A support bracket 72 is rigidly secured to the inboard side of the tubular casing by welding or the like and preferably defines a flat, vertically oriented, inside mounting surface 74 parallel to the central plane 69. A mounting plate 76 integrally secured to the stubshaft 54 is releasably secured to the mounting surface 74 by a plurality of threaded fasteners or bolts 78. These fasteners are disposed generally about the periphery of the mounting plate and extend therethrough, and are screwthreadably received in the support bracket 72.

As illustrated in FIG. 1, a plurality of roller wheels 80 are rotatably connected to the underside of the channel-shaped base 63. As shown more specifically in FIG. 7, a mounting pad 81 is rigidly secured to the bottom surface of the base as by welding and a tubular casing 82 is releasably secured to the mounting pad and base by a plurality of threaded fasteners or bolts 83. Each of the roller wheels 80 includes an inboard wheel portion 84 and an outboard wheel portion 85 interconnected by a live cross shaft 86, and a pair of laterally spaced bearings 87 seated within the tubular casing for rotatably supporting the cross shaft.

Figure 7:
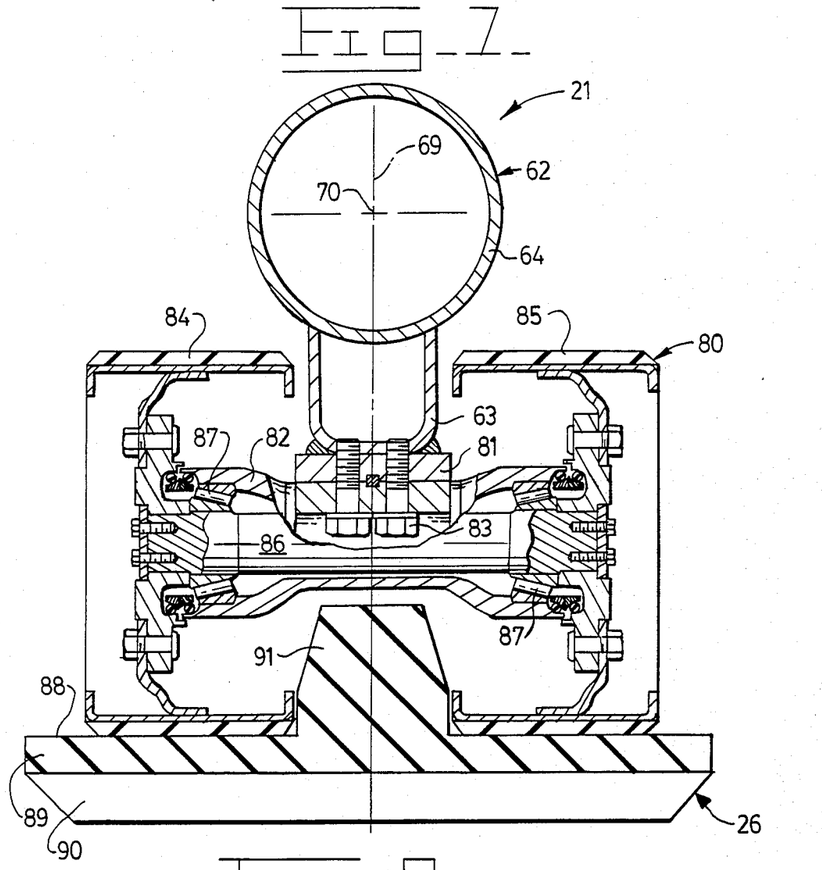
FIG. 7 is a diagrammatic and enlarged cross sectional view of a typical roller wheel underlyingly connected to the main body of the track roller frame as taken along line VII—VII of FIG. 1.

Each of the supporting roller wheels 80 runs against a smooth inner surface 88 of the endless drive belt 26 illustrated in cross section in FIG. 7. The relatively flat elastomeric body 89 of the belt has a plurality of externally located ground-engaging bars 90 and a plurality of internally located guide members 91 integrally formed therewith. The drive belt is preferably reinforced by internal cables or the like, not illustrated, so that it is substantially inextensible.

In order to apply proper tension to the drive belt 26 and to allow obstacles in the path of the vehicle to be traversed with minimum shock to the undercarriage 18, the front idler wheel 24 shown in FIG. 1, including inner and outer wheel portions 92 and 93, is supported for rotation about a transverse third axis 94 by a carrier 96 telescopically received in the tubular casing 64 and centrally disposed between the wheel portions. The carrier 96 is continually urged away from the drive wheel 22 or to the right when viewing FIG. 1 by a resiliently loaded recoil mechanism 97 of any conventional construction located generally within the tubular casing, and not shown for convenience.

As is shown in FIG. 4, the rear wheel 22 of the track roller frame assembly 21 includes a generally stepped tubular housing 98 and a shaft assembly 99 rotatably supported therewithin. The collar means 68 includes an annular supporting collar 100 which is preferably rigidly secured to the upper transition structure 66 and the lower base 63 by a welded coupling joint 102 located at the front face of the collar as can be appreciated by reference also to FIG. 1. The supporting collar has an internal mounting flange 104 which defines a cylindrical pilot bore 106 therethrough generally concentrically arranged with the second axis 71, and a plurality of cylindrical passages 108 therethrough. The housing 98 has an external mounting flange 110 defining a plurality of cylindrical passages 112 therethrough, and an external cylindrical pilot portion 114 which is insertable in the pilot bore 106. A plurality of fluted studs 116 are rigidly secured in the passages 112 of the mounting flange 110 which extend laterally outwardly through the passages 108, and a plurality of retaining nuts 118 are screwthreadably installed thereon in order to releasably couple the housing 98 to the collar 100.

The shaft assembly 99 is rotatably supported within the housing 98 by an inboard tapered roller bearing 120 and an outboard tapered roller bearing 122 laterally spaced on each side of the central plane 69. The shaft assembly includes an output shaft 124 defining a cylindrical inner end portion 126 and an inboard flange member 128, and an outboard flange member 130 is nonrotatably secured to the shaft and is releasably connected thereto by a conventional outboard retention device 132. FIG. 4 also shows that the wheel 22 has an inner wheel portion 134 and an outer wheel portion 136 which are releasably secured to the inboard and outboard end members 128 and 130 respectively by a plurality of threaded fastener devices 137 of the usual stud and nut type.

Pursuant to the present invention, a hydraulic drive motor 138 is provided within the wheel housing 98 for powerably rotating the shaft assembly 99. Preferably, each drive motor has a dual displacement capability so that it is capable of providing two speed ranges. Preferably, also, each one is of the reversible radial piston type and includes a plurality of rollers that roll on a plurality of exterior cams as is known in the art, although not illustrated. Such motors are, for example, commercially produced by Poclain Hydraulics of France and are highly efficient in producing high torque either in a low speed range or a high speed range. In order to obtain the high range and to increase the output speed, the pressure supply to half the pistons is bypassed through a suitable control assembly, not illustrated. An auxiliary disc-type parking brake 139 is also included between the housing 98 and the shaft assembly 99 and is of conventional construction.

Referring to FIG. 3, the pivoting support apparatus 38 can be noted to include a cross member or equalizer bar 140 having a midpoint or central portion 142 and laterally opposite distal ends 144. Advantageously, first coupling means or a first coupling device 146 is provided for pivotally connecting the central portion of the equalizer bar to the rear end 16 of the main frame 12, and second coupling means or a second coupling device 148 is provided for coupling each of the distal ends 144 to the respective one of the rear wheels 22 substantially along the second transverse axis 71. More specifically, the first coupling device 146 includes a cylindrically-shaped pivot pin 150 having a central axis 151 which is non-rotatably secured to a downwardly facing U-shaped bracket or saddle 152 connected to the rear end 16 of the main frame 12. Since the equalizer bar 140 is adapted to pivot on the pivot pin 150, the distal ends 144 thereof travel in arcuate paths as the vehicle 10 traverses uneven terrain. Accordingly, each of the second coupling devices 148 is constructed for universal connection to the shaft 124 of the rear drive wheels 22 as can best be appreciated by reference to FIGS. 4, 5 and 6. Particularly, two tapered roller bearings 156 and 158 are internally seated on the cylindrical inner end portion 126 of the rotatable shaft 124 in opposing relation and are secured in place by a releasable thrust-transmitting retaining plate 160. The anti-friction type roller bearings are externally seated in a cylindrical bore 162 of a trunnion member 164, and are individually adapted to engage a thrust ring 165 located between them in order to transmit thrust forces along axis 71 between the trunnion member and the shaft. The trunnion member 164 includes an annular body 161 defining a pair of blind cylindrical bores 163, and a pair of oppositely extending pivot pins 166 are pressed into the bores and arranged along a generally horizontal common axis 168 disposed in a vertical plane substantially parallel with the longitudinal midplane of the vehicle. The equalizer bar 140 has a rectangular box beam cross section and the distal ends 144 thereof define bifurcated arms 171 to receive the pivot pins 166. Opposite sleeve or needle bearings 170 are received in aligned cylindrical bores 172 formed in the arms, and these bearings rotatably support the pivot pins. The axis 168 of the pivot pins intersects the transverse axis 71. Also, a conventional seal ring 174 is disposed at each end of the bearings.

First Alternate Embodiment

Figure 8:
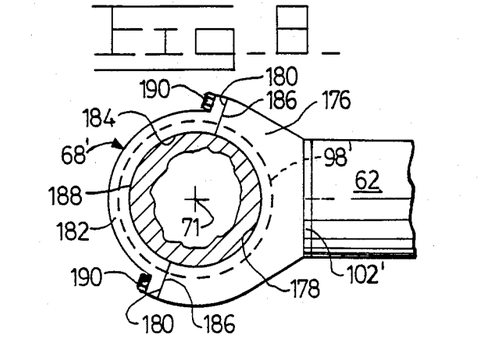
FIG. 8 is a diagrammatic, fragmentary, right-side elevational view of the rear portion of an alternate embodiment split-cap type collar means for releasably supporting the housing of the rear drive wheel.

While FIG. 4 illustrates the preferred fully-annular supporting collar 100 for load bearing engagement with the wheel housing 98, we further contemplate that the collar means 68 can be of the split-cap type. As is illustrated diagrammatically in FIG. 8, the alternate collar means 68' includes a base portion 176 defining an upwardly and rearwardly facing semi-cylindrical pocket 178 and diagonally opposite and aligned planar mounting surfaces 180. As in the preferred embodiment, the base portion 176 is rigidly secured to the elongate main body 62 by a welded coupling joint 102'. The collar means 68' also includes a retaining cap 182 defining a downwardly and forwardly facing semi-cylindrical pocket 184 and diagonally opposite and aligned planar mounting surfaces 186. Rather than having a flange mount, the wheel housing 98' defines a cylindrical groove 188 concentrically arranged along the second transverse axis 71, and the base portion 176 extends radially into the groove with the wheel housing 98' being seated in the pocket 178. The retaining cap 182 is likewise inserted into the groove and a plurality of threaded fasteners or bolts 190 are used to releasably secure the retaining cap on the base portion with the inclined mounting surfaces 180 and 186 in abutment. Moreover, the wheel housing groove 188 is preferably transversely centered on the central plane 69 as can be appreciated by reference to the embodiment of FIG. 4 to assume symmetrical load transfer to the elongate main body 62.

Industrial Applicability

In operation, the vehicle 10 can be driven in a straight-ahead mode wherein the opposite output shaft assemblies 99 are selectively driven at identical speeds by the rearwardly disposed hydraulic drive motors 138 at any ground speed within a low working speed range or within a relatively faster traveling speed range. These shaft assemblies are conjointly connected to the inner and outer wheel portions 134 and 136 which in the instant embodiment are adaptable to solely frictionally drive the elastomeric drive belt 26. In order to steer the vehicle an associated steering wheel, not shown, can be rotated in the desired direction and to the desired angular degree to reflect a speed difference between the opposite drive motors proportionate to the desired turn. Since one drive motor can be selectively hydraulically locked or even controllably reversed in rotational direction while the opposite drive motor is rotating in the forward direction, a compact turn can be easily achieved. At any time the auxiliary brakes 139 within the hydraulic drive motors may be simultaneously applied to retard or to stop the shaft assemblies 99.

As can be visualized by reference to FIGS. 1 and 3, when the vehicle 10 travels over uneven terrain the rearward end of the right undercarriage 18 can swing downwardly about its front pivot axis 36 while the rearward end of the left undercarriage 20 swings upwardly about its front pivot axis 36 due to their connections to the opposite ends of the centrally pivoted equalizer bar 140. As the undercarriages swing in opposite directions, the equalizer bar will pivot about the central pivot pin 150 and cause the axes 168 of the left and right pivot pins 166 shown in FIGS. 5 and 6 to travel in slightly arcuate paths about the central axis 151. But since the axis 71 of each drive wheel 22 is both longitudinally located and elevationally located to extend substantially through the axis 151 when the vehicle is on a horizontal plane, laterally inward travel of each of the axes 168 and associated drive wheels and the rear portion of each undercarriage is minimal as the rear portions of the undercarriages travel above and below the horizontal level. Furthermore, the central coupling device 146 and the outer coupling devices 148 cooperatively act together on the undercarriages to maintain the drive wheel axes 71 substantially parallel with the pivot axis 36.

The undercarriage 18 including the track roller frame 61, front and rear wheels 24 and 22, and the drive belt 26 can be very simply removed as a unit from the main frame 12. It is only necessary to place a support such as an adjustable jack, not illustrated under the front end 14 of the main frame to enable the pivot joint 34 shown in FIG. 2 to be uncoupled. Fasteners 48 are screwthreadably released to allow the lower retention caps 47 to be disconnected from the upper support blocks 45. Advantageously, the tubular housing 50 and the stubshaft 54 can thereafter be moved laterally away from the main frame without any lubricating fluid escaping from the pivot joint.

Figure 6:
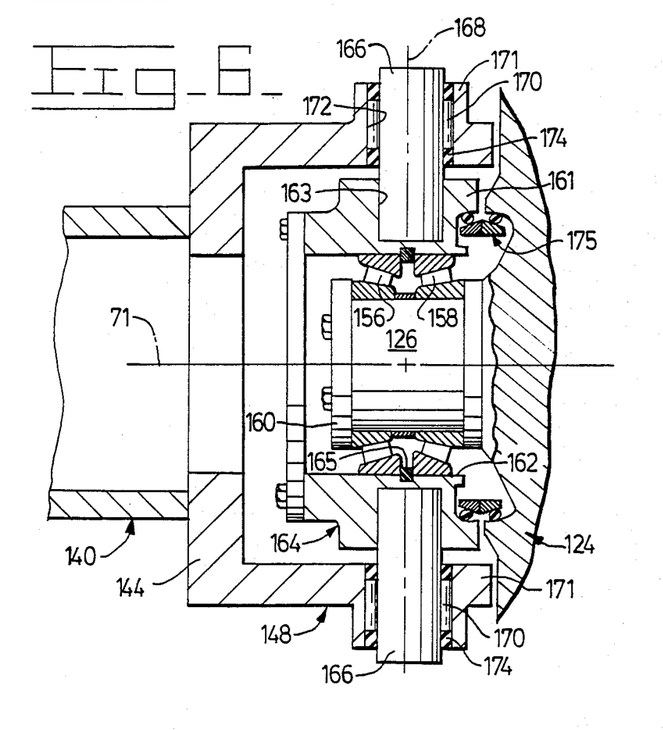
FIG. 6 is a diagrammatic, fragmentary, and cross sectional view of the coupling means illustrated in FIG. 5 as taken along line VI—VI thereof.

Another support, not illustrated, can be placed under the rear end 16 of the main frame 12 to permit the second coupling device 148 shown in FIG. 6 to be uncoupled. This can be easily accomplished by pulling the pivot pins 166 respectively forwardly and rearwardly out of the blind bores 163 provided in the trunnion body 161. With the disassembly of any hydraulic and/or electric lines, this frees the trunnion body, the shaft 124, the drive motor 138, and the entire track roller frame assembly 21 from the main frame.

It is apparent from the foregoing that the track roller frame assembly 21 of the present invention is simple and rugged in construction and compatible with the suspension structure 28. As is shown in FIG. 4, the hydraulic drive motor 138 is centrally mounted on the track roller frame 62 in a protected location laterally within the width envelope of the drive belt 26 and generally within the inner and outer wheel portions 134 and 136. Thus, the drive motors are less susceptible to possible damage, and do not tend to collect debris. Moreover, the equalizer bar 140 is of a relatively small cross section and the second coupling device 148 is compact so that a minimal upper surface area is presented for the accumulation of debris.

In regard to the preferred central disposition of the drive motor 138 within the drive belt envelope, it can be appreciated from reference to FIGS. 1 and 4 that the tension loads on the drive belt 26 are directed relatively evenly and/or symmetrically through the inner and outer wheel portions 134 and 136 and to the shaft 124. As earlier stated, these tension loads are due to the carrier 96 being urged forwardly in a continuously resilient manner by the recoil mechanism 97. Thereafter, these same forces are directed through the laterally separated inner and outer roller bearings 120 and 122 to the housing 98 and to the mounting flange 110 located centrally of the drive motor 138 and on the central plane 69 in two relatively equivalent force-transmitting paths. In a single force-transmitting path, the loads are directed into the mounting flange 106 of the supporting collar 100 which is also generally located on the central plane 69 of the track roller frame 61. The torque loads about the second axis 71 generated by operation of the hydraulic drive motors 138 are similarly transmitted radially outwardly to the supporting collar in a direct path substantially aligned with the same central plane 69. Such loading is very desirable to minimize stresses.

Other aspects, objects and advantages of this invention can be obtained from a study of the drawings, the disclosures and the appended claims.

We claim:

1. A track roller frame assembly of the type having an elongate main body and a plurality of roller wheels underlyingly connected to the main body, the main body being adapted to be connected to a vehicle main frame by a pivot joint having a first transverse axis, the track roller frame assembly comprising:
a wheel including a housing, a shaft assembly rotatably supported within the housing and having laterally opposite end members and laterally inner and outer wheel portions respectively connected to the opposite end members;
collar means for supporting the housing on the main body such that the shaft assembly is rotatable about an oscillatable second transverse axis, the collar means extending longitudinally and generally centrally between the wheel portions; and
a hydraulic drive motor protectingly located within the housing and between the wheel portions for powerably rotating the shaft assembly and the wheel portions.

2. The track roller frame assembly of claim 1 wherein the wheel portions are adaptable to solely frictionally drive an endless elastomeric drive belt formed into an endless loop and entrained about the wheel and the roller wheels.

3. The track roller frame assembly of claim 2 wherein each of the roller wheels includes inboard and outboard wheel portions and a rotatable cross shaft interconnecting them.

4. The track roller frame assembly of claim 3 including an idler wheel having inner and outer wheel portions and means for centrally supporting the idler wheel on the main body and resiliently urging the idler wheel longitudinally away from the wheel driven by the hydraulic drive motor and against the drive belt.

5. The track roller frame assembly of claim 1 wherein the collar means includes a supporting collar defining a cylindrical bore therethrough on the second transverse axis and the wheel housing defines a cylindrical portion extending therewithin.

6. The track roller frame assembly of claim 5 including fastening means for releasably connecting the wheel housing to the supporting collar at a lateral position located generally between the wheel portions in general longitudinal alignment with the elongate main body.

7. The track roller frame assembly of claim 1 wherein the elongate main body has a longitudinally arranged, vertical central plane, the housing defines a radially outwardly extending mounting flange, and the collar means includes an annular supporting collar and means for releasably connecting the mounting flange to the supporting collar generally along the central plane.

8. The track roller frame assembly of claim 1 wherein the collar means includes a base portion connected to the main body and defining a first semi-cylindrical pocket, a retaining cap defining a second semi-cylindrical pocket, and fastening means for releasably connecting the retaining cap to the base portion in an encircling relationship to the wheel housing.

9. A track roller frame assembly adapted to be connected to a vehicle main frame for driving an elastomeric drive belt comprising:
an elongate track roller frame including a main body having a longitudinally arranged, vertical central plane, pivot means on the main body for pivotal connection to the vehicle main frame, and a supporting collar connected to the main body substantially along the central plane;
a plurality of roller wheels underlyingly connected to the main body;
a wheel including a housing encirclingly supported by the supporting collar longitudinally away from the pivot means, a shaft assembly, bearing means for rotatably supporting the shaft assembly within the housing, and inner and outer wheel portions connected to the opposite ends of the shaft assembly; and
a hydraulic drive motor protectingly located radially within the housing and laterally between the wheel portions for powerably rotating the shaft assembly and the wheel portions and driving the drive belt entrained about the wheel and the roller wheels.

10. The track roller frame assembly of claim 9 wherein the wheel portions are substantially contained laterally within the width of the drive belt.

11. The track roller frame assembly of claim 9 wherein the wheel portions are adapted to solely frictionally drive the drive belt.

12. The track roller frame assembly of claim 9 wherein the supporting collar includes an internal mounting flange defining a cylindrical bore, the housing includes an external mounting flange, and fastening means are provided for releasably connecting the flanges together with the housing being generally laterally centered within the bore.

13. The track roller frame assembly of claim 9 wherein the bearing means includes first and second bearings located generally symmetrically at the opposite sides of the central plane to evenly transmit forces from the drive belt to the housing and the supporting collar.

14. The track roller frame assembly of claim 9 wherein the hydraulic drive motor is of the reversible radial piston type and powerably acts directly between the housing and the shaft assembly substantially in alignment with the central plane.

* * * * *